United States Patent
Strom

(10) Patent No.: US 8,601,883 B2
(45) Date of Patent: Dec. 10, 2013

(54) ACOUSTIC SENSOR FOR AVERAGING PITOT TUBE INSTALLATION

(75) Inventor: Gregory Robert Strom, Boulder, CO (US)

(73) Assignee: Dieterich Standard, Inc., Boulder, CO (US)

( * ) Notice: Subject to any disclaimer, the term of this patent is extended or adjusted under 35 U.S.C. 154(b) by 508 days.

(21) Appl. No.: 12/615,945

(22) Filed: Nov. 10, 2009

(65) Prior Publication Data

US 2011/0107847 A1    May 12, 2011

(51) Int. Cl.
*G01F 1/32* (2006.01)
*G01F 1/46* (2006.01)

(52) U.S. Cl.
USPC ..................... 73/861.24; 73/861.65

(58) Field of Classification Search
None
See application file for complete search history.

(56) References Cited

U.S. PATENT DOCUMENTS

| | | | | |
|---|---|---|---|---|
| 4,455,877 A * | 6/1984 | Blechinger et al. | ......... | 73/861.22 |
| 4,770,035 A * | 9/1988 | Kolkebeck et al. | ......... | 73/861.22 |
| 5,060,522 A * | 10/1991 | Lew | ......... | 73/861.02 |
| 5,152,181 A * | 10/1992 | Lew | ......... | 73/861.02 |
| 6,321,166 B1 * | 11/2001 | Evans et al. | ......... | 702/50 |
| 6,957,586 B2 * | 10/2005 | Sprague | ......... | 73/861.22 |
| 7,308,832 B1 * | 12/2007 | Ifft et al. | ......... | 73/861.24 |
| 7,366,621 B2 * | 4/2008 | Sprague | ......... | 702/45 |
| 8,448,515 B2 * | 5/2013 | Orleskie | ......... | 73/861.65 |
| 2012/0180572 A1 * | 7/2012 | Lawrence | ......... | 73/861.65 |

* cited by examiner

*Primary Examiner* — Harshad R Patel
(74) *Attorney, Agent, or Firm* — Westman, Champlin & Kelly, P.A.

(57) ABSTRACT

Apparatus and method for detecting the mounting mode of a bluff body inserted into a fluid carrying conduit by detecting and displaying the natural frequency of vibration of the bluff body caused by the pressure of the flowing fluid.

11 Claims, 2 Drawing Sheets

ACOUSTIC SENSOR FOR AVERAGING PITOT TUBE INSTALLATION

FIELD OF THE INVENTION

The present invention relates to a method and apparatus for determining the point at which the distal end of the bluff body sensor of an averaging pitot tube makes anchoring contact with the inside of a fluid conduit during installation of the pitot tube in the conduit.

BACKGROUND OF THE INVENTION

It is often necessary to install a pitot tube type of fluid flow meter into a conduit while pressurized liquid or gas is flowing in the conduit. Apparatus has been designed to implement this type of installation, including, for example, the Rosemont 485 Annubar® Flanged Flo-Tap Assembly. In making use of this or similar apparatus to insert a sensor into a pressurized fluid conducting conduit it is extremely difficult to determine whether the bluff body sensor portion of the averaging pitot tube is completely inserted in the conduit, that is, inserted diametrically into the conduit so that the distal end of the bluff body sensor is in firm and stable contact with the inside surface of the conduit opposite the point of insertion. If not firmly seated against the wall of the conduit the sensor is subject to breaking. Conversely, the pitot tube sensor can be damaged if the insert-retract mechanism is over tightened during installation. One particular technique of the prior art utilizes colored markings on the sensor to visually indicate the distal end's approach to the far side of the conduit. Such a method however, lacks the finesse necessary to insure proper seating of the sensor or guard against damage during insertion. Furthermore, during actual operation of the flow meter, if the signal from an averaging pitot tube disappears it is very difficult to determine whether the bluff body has broken away from the pitot tube assembly or whether its pressure ports are plugged. Additionally, with the current state of the art there is no way to verify whether an averaging pitot tube is accurately tracking the changes in the fluid flow rate in a conduit.

Accordingly, the primary object of the present invention is to establish a method and apparatus that will overcome the aforesaid difficulties encountered in the installation and proper monitoring of the operation of an averaging pitot tube type of fluid flow meter.

A further object of the invention is to create, with the same apparatus as employed for detecting the proper seating of the pitot tube bluff body on the opposite conduit wall, redundant measurement of fluid flow rate by use of the Von Karman effect.

SUMMARY OF THE INVENTION

During insertion of a pitot tube bluff body through one wall of and into a fluid carrying conduit the bluff body assumes the character of a cantilevered beam that vibrates at its natural frequency. When the distal end of the bluff body contacts the inside surface of the opposite conduit wall the bluff body becomes a beam that is supported at both of its ends and the natural frequency of its vibration in the flowing fluid increased to approximately twice the vibration frequency of the cantilevered beam.

Utilizing the vibration of the bluff body, the present invention contemplates an acoustic sensor, mounted on the exterior of the conduit a few inches downstream of the insertion point of the pitot tube, which acoustic sensor will detect the frequency of vibration of the pitot tube bluff body during its installation into the fluid carrying conduit. When a change of frequency is detected by either audible or visual electronic indications the operator of the insert mechanism will be made aware that the bluff body has been properly seated on the opposite wall of the conduit.

Thus, the method of the present invention of installing a pitot tube into a fluid carrying conduit can be reduced to the following steps:

inserting the elongated bluff body of the pitot tube diametrically into a fluid carrying conduit, sensing the frequency of fluid flow induced vibration of the bluff body, observing a first frequency of vibration of the bluff body of the pitot tube, observing a second frequency of vibration of the bluff body of the pitot tube, stopping the insertion upon observation of the said second frequency.

DETAILED DESCRIPTION

Figure 1:
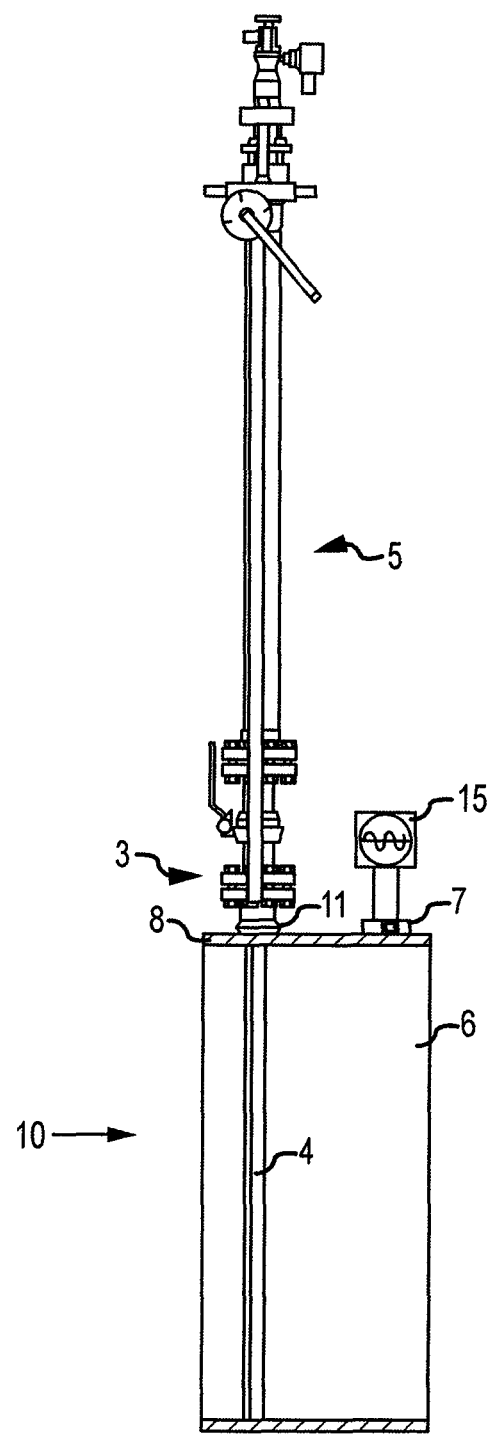
FIG. 1 is a fragmentary cross sectional side view of a fluid carrying conduit having a pitot tube type of fluid flow meter inserted therein with an attached insert-retract mechanism such as the Rosemont 485 Annubar® Flanged Flo-Tap assembly

Referring first to FIG. 1, a pitot tube type of fluid flow meter 3 is shown installed in a fluid carrying conduit 6. The direction of fluid flow is shown by arrow 10. The bluff body 4 of the pitot tube is positioned diametrically of the conduit 6, having been inserted into the conduit by an insert-retract mechanism 5 through an opening in wall 8 of the conduit. An acoustic sensor 7 is attached to the exterior of the conduit wall 8 a few inches downstream of the pitot tube.

Figure 4:
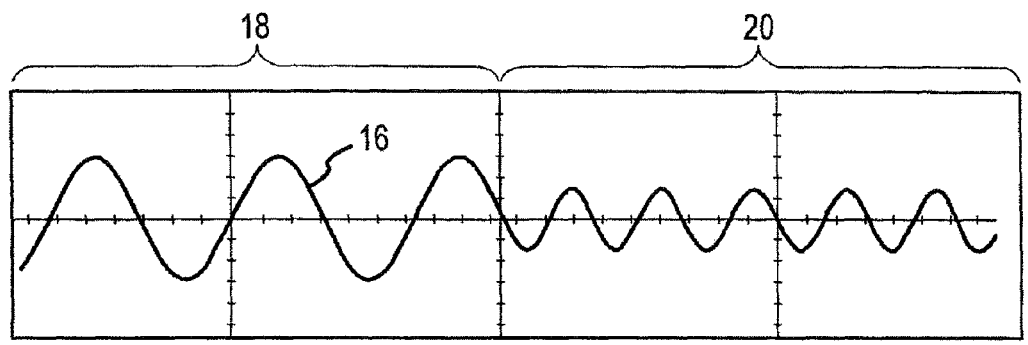
FIG. 4 is a diagrammatic showing of the natural frequencies of vibration of the bluff body of a pitot tube in the two mounting modes depicted in FIGS. 2 and 3, as might be seen on an oscilloscope that senses the output of the acoustic sensor mounted on the conduit downstream from the point of insertion of the pitot tube.
Figure 2:
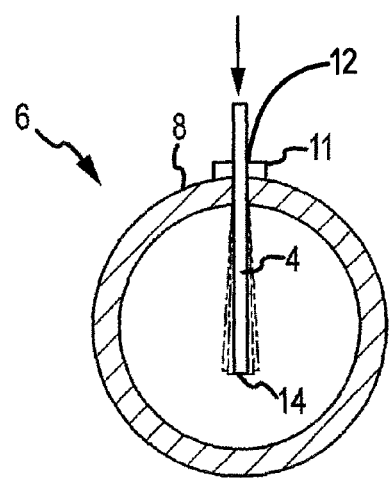
FIG. 2 is a diagrammatic lateral cross sectional view of the fluid carrying conduit of FIG. 1 where the pitot tube bluff body is shown partially inserted into the conduit and functioning in a cantilever mode. The dashed lines represent the natural frequency vibrations of the bluff body caused by the pressure of the flowing fluid in the conduit.
Figure 3:
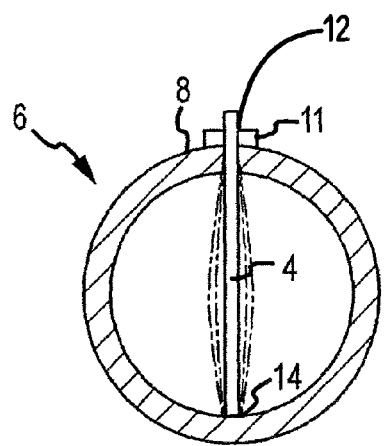
FIG. 3 is a similar diagrammatic view to that of FIG. 2 but showing the pitot tube bluff body fully inserted into the conduit where both the distal and proximal ends of the bluff body are secured in a pin-pin mode. The dashed lines represent the natural frequency vibrations of the bluff body caused by the flowing fluid in the conduit.

FIGS. 2, 3 and 4 illustrate the natural frequency of vibration of the bluff body 4 during the two phases of insertion of the bluff body into the conduit 6. The first phase of insertion is where the bluff body slides through a pipe fitting 11 welded to the conduit in a position surrounding the opening in the pipe through which the bluff body is inserted. The close contact between the bluff body and the pipe fitting during the insertion stabilizes the portion of the bluff body that is in contact with the pipe fitting. As the bluff body is being inserted into the conduit, the point of bluff body contact with the pipe fitting (referred to herein as the proximal end 12) moves. That portion of the bluff body which extends into the conduit during insertion becomes a cantilevered beam having a distal end 14.

The natural frequency of vibration 16 of the cantilevered bluff body is sensed by the sensor 7 and is depicted over a period of time 18 in FIG. 4. When the distal end 14 of the bluff body 4 contacts the inside surface of the conduit 6, as shown in FIG. 3, the second phase of insertion has been reached. In the second phase when the distal end of the bluff body is also stabilized by being firmly seated against the conduit wall the cantilever character of the beam changes to a pin-pin mode and the natural frequency of vibration of the bluff body increases, as depicted in time interval 20 in FIG. 4. The point in time between time intervals 18 and 20 is the point where the distal end 14 of the bluff body 4 makes firm contact with the opposing conduit wall.

The simplest form of apparatus for detecting the contact of the bluff body with the opposing conduit wall is to direct the output of the acoustic sensor 7 to an oscilloscope 15 where the frequency of the bluff body can be monitored during insertion of the body into the conduit. Other traditional methods of detection can also be used.

The use of an acoustic sensor during installation of the pitot tube also has advantages following installation since the bluff body is a vortex shedding body in flowing fluid. That is, as the fluid moves past the bluff body a repeating pattern of vortices (whirlpools) are formed in the fluid which are caused by the unsteady separation of fluid flow over the bluff body. The vortex shedding frequency (i.e., the number of vortices shed per second) is directly proportional to the flow velocity. A vortex flow meter utilizing this principal is an application of the Von Karman effect.

An acoustic sensor such as, for example, the Siemens Sitrans AS 100, will not only detect the natural frequency of the vibrating bluff body, as described above, it will measure the vortex shedding frequency of the pitot tube bluff body. Providing redundant fluid flow measurement increases measurement confidence, ensures reliability and has other unexpected advantages. First, comparison of the vortex frequency and the differential pressure measurement provided by the pitot tube can identify the presence of a measurement problem as soon as it occurs. Second, measuring the frequency of the vortices shed by the bluff body in conjunction with standard differential pressure measurement can allow an inference of fluid density within a few percent pursuant to the following computations:

The equation for vortex shedding frequency is as follows $$\eta_{wake} = \frac{SV}{h}$$

where:
S=Strouhal number
V=Fluid velocity
H=Probe width

The equation for volume rate of flow in gas at actual conditions for a pitot tube primary element is:

$$Q_a = F_{na} \cdot K \cdot D^2 \cdot Y \cdot F_{aa} \cdot \sqrt{\frac{1}{P_f}} \sqrt{h_w}$$

where:
$Q_a$=Volume rate of flow of gases
$F_{na}$=Units conversion factor
K=Annubar flow coefficient
D=Pipe ID
Y=Annubar gas expansion factor
$F_{aa}$=Thermal expansion factor
$P_f$=Flowing density
$h_w$=Differential pressure Volume flow rate of gas is equal to the fluid velocity times the area of the inside of the pipe. Therefore, the assumed pf in the above equation can be verified using the results from the vortex calculation. The accuracy can be determined within a few percent.

The volume flow rate of gas is equal to the fluid velocity times the area of the inside of the conduit in which the gas is flowing. Therefore, the assumed pf in the above equation can also be verified using the results from the vortex calculation.

What is claimed is:

1. A method for determining a support mode of a bluff body of a pitot tube flow meter inserted into a fluid-carrying conduit, comprising the steps of:
   diametrically inserting a distal end of the bluff body into the fluid-carrying conduit by an axial movement thereof,
   detecting a first frequency of vibration of the bluff body as the bluff body slides through a pipe fitting connected to the conduit,
   detecting a second frequency of vibration of the bluff body in response to stabilization of a distal end of the bluff body through contact with a wall of the conduit, wherein the wall is opposite the pipe fitting, and
   stopping the insertion of the bluff body upon detection of the second frequency.

2. The method of claim 1 where the second frequency is greater than the first frequency.

3. The method of claim 1, wherein step of detecting the first frequency of vibration of the bluff body or the step of detecting the second frequency of vibration of the bluff body can be performed by visual electronic indications.

4. A system for monitoring acoustic frequencies generated by a bluff body of a pitot tube type of fluid flow meter, comprising:
   a conduit for carrying flowing fluid and having a wall, including means for mounting a pitot tube type of flow meter within the wall,
   an acoustic sensor having an output and carried by the conduit proximate to and downstream of the means for mounting the pitot tube, said sensor configured to generate an electrical signal in response to acoustic frequencies created in response to the fluid flowing in the conduit over the bluff body, and
   indicator means connected to the output of the sensor for generating an indication responsive to the output of the sensor;
   wherein the acoustic sensor senses the natural vibration frequency of the bluff body and the indicator means is configured to indicate when the sensed frequency changes values, indicating that the support mode of the bluff body inserted into the conduit has changed.

5. The system of claim 4 where the acoustic sensor senses the frequency of vortex shedding from the bluff body inserted into the conduit.

6. A pitot tube flow meter configured to measure flow of fluid through a conduit, the pitot tube flow meter comprising:
   a bluff body configured to be diametrically inserted into the conduit through a point of insertion, wherein the bluff body comprises a distal end configured to make anchoring contact with a distal side of the conduit which is opposite the point of insertion during installation of the bluff body in the conduit; and an acoustic sensor configured to detect first and second frequencies of vibration of the bluff body as the bluff body is inserted into the conduit through the point of insertion, wherein, the second frequency of vibration of the bluff body is in response to stabilization of the distal end of the bluff body through contact with a wall of the conduit.

7. The assembly of claim 6, further comprising a pipe fitting mounted to the point of insertion and configured to receive a proximate end of the bluff body therethrough, wherein the proximate end and the pipe fitting provide a proximal point of contact.

8. The assembly of claim 7, wherein the bluff body resonates at the first frequency based upon the proximal point of contact.

9. The assembly of claim 8, wherein the bluff body resonates at the second frequency when the distal end of the bluff body contacts the distal side of the conduit.

10. The assembly of claim 6, wherein the acoustic sensor is mounted to the conduit.

11. The assembly of claim 10, wherein the acoustic sensor is mounted downstream relative to the point of insertion.

* * * * *